United States Patent [19]
Kammleiter et al.

[11] Patent Number: 4,895,454
[45] Date of Patent: Jan. 23, 1990

[54] METHOD OF DETERMINING THE TEMPERATURE OF A WORKPIECE IN A FLEXIBLE MANUFACTURING SYSTEM

[75] Inventors: Bernd Kammleiter; Karl Schepperle, both of Oberkochen, Fed. Rep. of Germany

[73] Assignee: Carl-Zeiss-Stiftung, Heidenheim, Fed. Rep. of Germany

[21] Appl. No.: 240,816

[22] Filed: Sep. 6, 1988

[30] Foreign Application Priority Data

Sep. 4, 1987 [DE] Fed. Rep. of Germany ....... 3729644

[51] Int. Cl.⁴ .......................... G01K 7/10; G01N 25/00
[52] U.S. Cl. ................................. 374/163; 340/870.17; 364/571.03; 374/6
[58] Field of Search ...................... 374/6, 7, 141, 163; 364/478, 571.03; 340/870.17

[56] References Cited

U.S. PATENT DOCUMENTS

| | | | |
|---|---|---|---|
| 3,084,986 | 4/1963 | Schoneck | 374/141 X |
| 3,491,277 | 1/1970 | Brainard | 364/571.03 X |
| 3,878,721 | 4/1975 | Nath | 340/870.17 X |
| 4,588,880 | 5/1986 | Hesser | 364/478 X |
| 4,747,413 | 5/1988 | Bloch | 340/870.17 X |

FOREIGN PATENT DOCUMENTS

| | | |
|---|---|---|
| 0120102 | 10/1984 | European Pat. Off. |
| 3013378 | 12/1984 | Fed. Rep. of Germany |
| 3620118 | 12/1987 | Fed. Rep. of Germany |

Primary Examiner—Daniel M. Yasich
Attorney, Agent, or Firm—Walter Ottesen

[57] ABSTRACT

The invention is directed to a method providing for the automatic temperature measurement with a precision which is required for the correction of errors introduced by temperature in a coordinate measurement made on a workpiece. To achieve this automatic temperature measurement, a self-sufficient sensor assembly is attached to the workpiece carrier or the workpiece itself and includes a temperature sensor, a measuring electronic circuit and a voltage supply. The sensor assembly runs through the material flow on the pallet with the workpiece and wirelessly transmits the measured temperature values of the workpiece to appropriate remote stations.

8 Claims, 3 Drawing Sheets

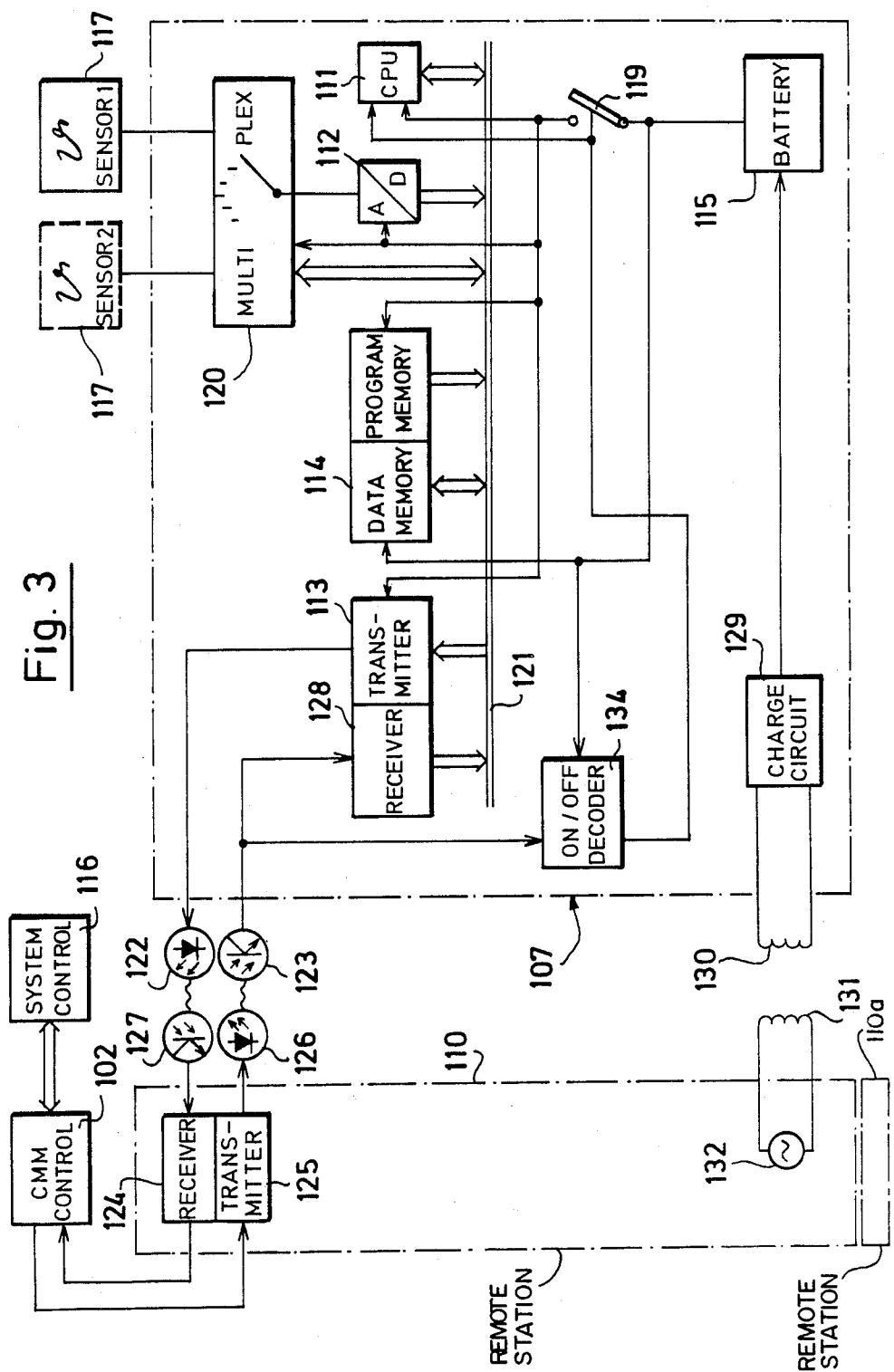

METHOD OF DETERMINING THE TEMPERATURE OF A WORKPIECE IN A FLEXIBLE MANUFACTURING SYSTEM

FIELD OF THE INVENTION

The invention is directed to a method for determining the temperature of a workpiece in a flexible manufacturing system. The method preferably corrects errors introduced by temperature when making length measurements on the workpiece.

BACKGROUND OF THE INVENTION

In recent times, coordinate measuring apparatus are utilized in increasing numbers directly in the manufacturing area and are interlinked with the processing machines such as a flexible manufacturing system.

In such interlinked systems, it is not possible to carry out length measurements on the workpiece at a reference temperature of 20° C. The workpiece has undergone a change in temperature because of the just completed manufacturing process which includes washing and drying operations. This other temperature must be determined and considered in arriving at the measuring result.

The determination of the workpiece temperature has been carried out manually up to now in that operating personnel placed a temperature sensor on the workpiece and the temperature value would then be read off and would be inputted into the computer of the coordinate measuring apparatus.

German Patent 3,013,378 discloses a method wherein the processed workpieces are delivered automatically to a measuring device equipped with a temperature sensor. The workpiece is measured with respect to its dimensions and its temperature. For obtaining control data for the machining process, the measuring values are compared with corresponding values of a reference workpiece which is always measured anew at regular intervals.

The known method is, however, poorly suited if workpieces having different geometries are to be automatically measured. For this situation, a complex manipulating system is required to bring the temperature sensor into contact with the workpiece.

It is necessary to detect the workpiece temperature to 0.1° K. for precise length measurements. Known temperature sensors which operate without contact have up to now not been able to detect temperatures with this precision. For temperature detection with high precision, precision resistors or thermistors are mostly utilized which, however, must be connected to an electronic circuit for the generation of measurement data and also must be connected to a voltage supply. The required cable connections required for this purpose constitute a disturbance in the material flow systems.

Furthermore, the precision resistors utilized for the temperature measurement have a relatively long time constant. After such a temperature sensor is mounted on a workpiece, it then takes several minutes until the exact temperature value of the workpiece can be read off. This time constant causes standstill periods of the coordinate measuring apparatus.

SUMMARY OF THE INVENTION

It is an object of the invention to provide a method for determining the temperature of workpieces in a flexible manufacturing system which permits an automatic temperature detection with high precision and with the least possible additional complexity. It is another object of the invention to provide such a method wherein the temperature is automatically detected with such a precision as is required for the correction of errors introduced by temperature when making length measurements on the workpieces.

According to a feature of the method of the invention, a self-sufficient sensor assembly is installed on the workpiece itself and runs through the material flow with the workpiece and transmits the measured temperature values of the workpiece to appropriate remote stations.

With this measure, it is possible to assure an adequately precise temperature measurement with this measurement occurring automatically independently of the geometry of the workpiece.

Since the sensor assembly always remains on the workpiece and runs through the material flow together with the workpiece, the temperature value measured by the sensor corresponds exactly to the temperature of the workpiece. For this reason, delay times of the apparatus utilized to make length measurements are avoided which could otherwise occur when the sensor is seated on the workpiece shortly before carrying out the length measurement program.

German Patent 3,620,118 discloses how the temperature values for correcting the length measurement values determined by the coordinate measuring apparatus are utilized.

The self-sufficient sensor assembly preferably has its own voltage supply and is mounted in an encapsulated housing. The sensor assembly also has a temperature sensor and an electronic circuit means connected for generating measured values. In this way, the sensor assembly can remain on the workpiece during the entire passage through the manufacturing system including the washing and drying operations.

During the transmission of measured values, the voltage supply of the sensor can preferably be charged by additionally transmitting energy to the sensor assembly such as by capacitive or inductive coupling from the remote station.

In order to assure a reliable operation, it is advantageous if the control computer of the coordinate measuring apparatus integrated into the flexible manufacturing system subjects the measured value of temperature after transmission of the latter to a plausibility check. In this way, disturbances can be recognized such as, for example: too low a voltage supply, a failure of the data transmission, an exceeding of the permissible temperature range and the like. These detected disturbances are then supplied to the master computer of the flexible manufacturing system. The master computer is then capable of causing corrective measures to be taken such as an exchange of the sensor assembly or a change of manufacturing parameters.

If the sensor assembly is also provided with a data memory, then it is not only possible to retain the measured temperature values at the individual processing and measuring stations; but also, the memory can serve to store an identifier for identifying the workpiece connected with the sensor assembly. With the aid of the identifier transmitted to the remote station, it is then possible to automatically call up the measuring program provided for the workpiece. Furthermore, measurement data determined in the course of the measuring program can then be transmitted from the remote station to the sensor assembly and be stored in the memory. These measured values then can be used, for example, to set switches at sorting stations of the manufacturing system where the workpieces are separated qualitatively based on the measuring result.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
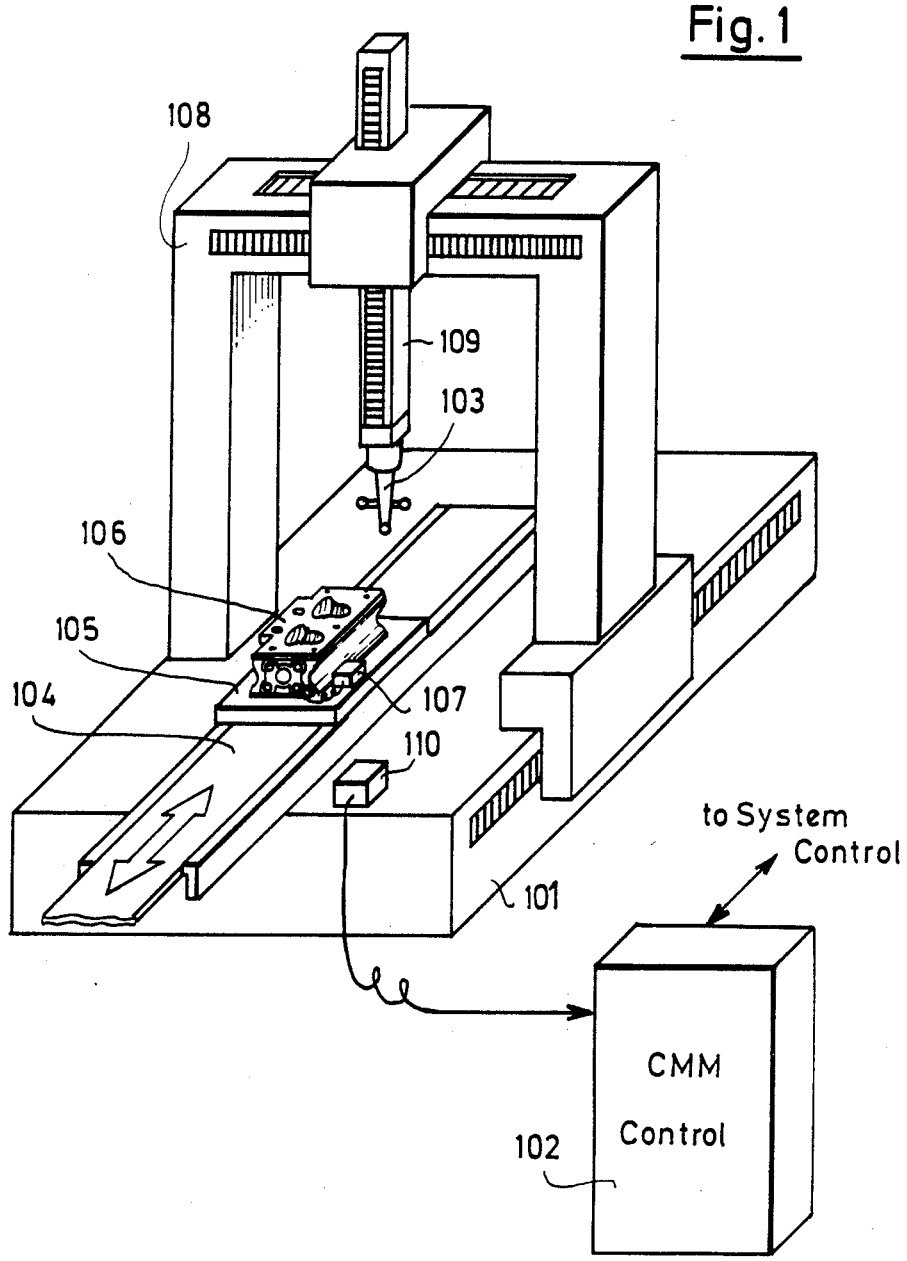
FIG. 1 is a perspective schematic of a coordinate measuring apparatus integrated into a flexible manufacturing system.
Figure 2:
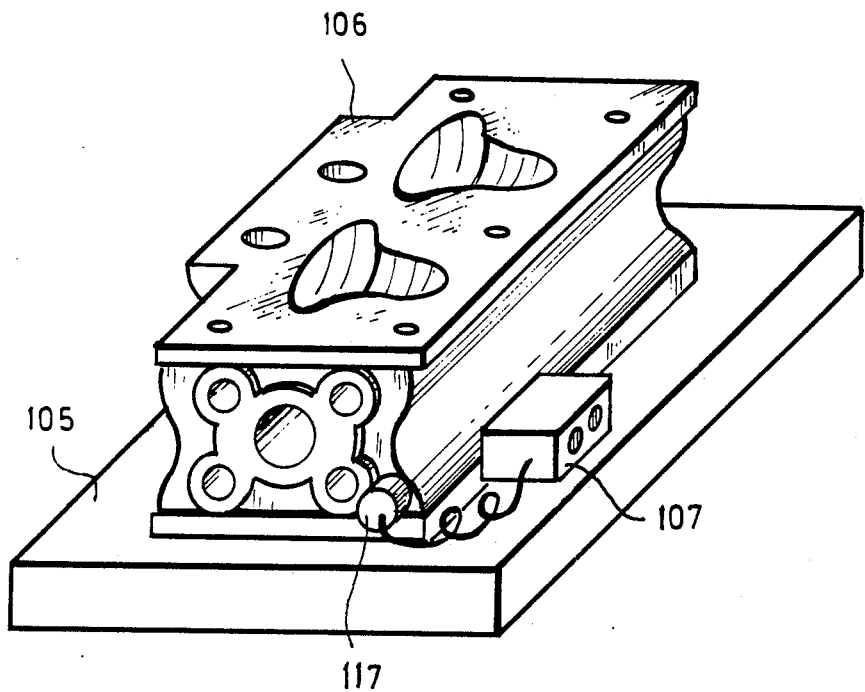
FIG. 2 is an enlarged perspective view of the workpiece, the workpiece carrier and the sensor assembly of FIG. 1; and, FIG. 3 is a schematic block diagram which includes the sensor assembly of FIGS. 1 and 2.

FIG. 1 shows a coordinate measuring apparatus having a portal configuration equipped with a sensing head 103 which can be driven along the three measuring axes (x, y and z). The three scales arranged on the portal 108, the machine base 101 and the arm 109 of the measuring machine are utilized to measure the travel paths.

The coordinate measuring apparatus is connected with a flexible manufacturing system (not shown) via a conveying arrangement 104 by means of which the workpieces 106 are brought in with the workpieces being secured to component carriers in the form of pallets 105. A sensor assembly is additionally attached to each pallet 105 and includes: one or more temperature sensors 117 seated on the workpiece; the electronic circuit necessary for generating the measurement data; and, its own voltage source. Except for the temperature sensor 117, the sensor assembly is mounted in an encapsulated housing 107 and passed with the workpiece 106 through the manufacturing process including the washing and drying operations.

FIG. 3 is a schematic block diagram showing the sensor assembly. The central unit of the electronic circuit in the housing 107 is a microprocessor 111. The microprocessor 111 is connected with the temperature sensors 117 via a multiplexer 120 as well as an analogue-to-digital converter 112. The microprocessor 111, for example, carries out a temperature measurement pursuant to the four-wire method and conducts the calibration and linearization of the measured values pursuant to a predetermined program. Such measuring circuits are disclosed, for example, in European patent application 83102881.6 published on Oct. 3, 1984 (publication no. 0 012 102 A1).

The microprocessor 111 is also connected with a storage component 114 via its data bus 121. The measured temperature values and the processing stations already passed through can be stored in the storage component 114. An identifier specific to a workpiece as well as the results of the coordinate measurement on the coordinate measuring apparatus of FIG. 1 can also be stored in the storage component 114.

The temperature values of the sensors 117 determined by the microprocessor 111 can be transmitted to the remote station 110 via a transmitting component 113 in the housing 107. In the illustrated embodiment, this component 113 drives an infrared diode 112 whose signal is coded by the microprocessor with the information to be transmitted. However, in lieu of the infrared diode, also another transmitter such as an ultrasonic transmitter can be utilized.

The current supply 115 for the microprocessor is connected via a switch 119 to the microprocessor and the remaining electronic units of the sensor assembly and is switched in by means of a signal of a decoder component 134. The decoder 134 is operatively connected to a sensor (phototransistor 123) responsive to infrared light. A further receiver 128 is connected to the sensor 123 and serves to retransmit data back to the microprocessor 111.

The remote station 110 includes a receiver component 124 for receiving the temperature values transmitted from the transmitter 113 of the sensor assembly and to receive the workpiece identifier stored in memory 114. The remote station 110 further includes a transmitter component 125 for transmitting the switching pulse for the supply voltage 115 and for the return transmission of measuring data to the memory 114 of the sensor assembly 107. The transmitter component 125 and the receiver component 124 are equipped in the same manner as corresponding components of the sensor assembly, that is, with a photodiode 120 as a transmitter and a phototransistor 127 as a detector, respectively.

The voltage supply 115 is connected to a charge circuit 129 and receives the energy necessary for recharging from a coil 130. When the pallet with the workpiece dwells at predetermined positions in the material flow, the coil 130 is inductively coupled with a second coil 131 connected to an alternating voltage source 132. In the embodiment shown, the remote station 110 is also provided with an arrangement (131, 132) of this kind for recharging the voltage source 115.

The remote station 110 is connected with the control computer 102 of the coordinate measuring apparatus of FIG. 1 which, in turn, communicates via a data line with the master computer 116 of the flexible manufacturing system.

A temperature measurement takes place in the manner explained below for the system described above.

In a task station, the pallet 105 is loaded with the workpiece 106 as well as the sensor assembly (107, 117) having a battery 115 which is charged. A coupling position is arranged at the task station whereat an identifier for the loaded pallet is transmitted to the sensor assembly and stored in memory 114. The identifier identifies the workpiece mounted on the pallet. Thereafter, the workpiece on the pallet begins to run through the manufacturing process.

Remote stations are provided on the disposal station of the particular production machine and, after each completed processing step, information upon completion of this step is transmitted via these remote stations to the sensor assembly and is likewise stored in the memory 114. One of the remote stations is shown in detail in FIG. 3 at 110 and a second remote station is represented schematically by block 110a also in FIG. 3. When the pallet 105 reaches the coordinate measuring system after a completed processing of the workpiece 106, the remote station 110 switches on the voltage supply 115 of the sensor assembly via a pulse transmitted to the decoder 134. Thereafter, the workpiece identification data and the status data are read by the remote station 110. With the aid of these data, the measuring program required for the workpiece 106 is called up in the computer 102 of the coordinate measuring apparatus. The necessary temperature measuring values of the workpiece 106 are then interrogated in the course of the measuring program. The measuring program can also interrogate the temperature measuring values of several sensors 117 mounted on the workpiece 106 insofar as the sensors are provided for an appropriate size of the workpiece.

The computer 102 then subjects the received temperature measuring values to a plausibility check. The coordinate measuring program is only conducted if the temperature lies within a permissible range. Otherwise, a failure signal is sent to the master computer 116 of the flexible manufacturing system. The master computer 116 can cause the pallet to be transported back to the task station where, for example, a new temperature sensor can be placed in service if the nature of the error is caused by a malfunction in the sensor such as too low a supply voltage or dirtied data transmitting equipment.

After a completed coordinate measuring has been made, the measuring result is transmitted via the remote station 110 to the receiver 128 and stored by microprocessor 111 in a memory 114 of the sensor assembly. Furthermore, a qualitative statement with respect to the measuring result is stored upon which the further processing of the workpiece is dependent.

When the pallet 105 leaves the coordinate measuring apparatus 101, it reaches a sorting station in which the last-mentioned information is interrogated. Switches are here so positioned that the workpiece can be selected according to class or can be selected or separated as to acceptable and unacceptable and be directed further.

In the above embodiment, a sensor assembly was described wherein the electronic circuit and one or more temperature sensors are connected with each other via a flexible cable. However, it is also possible to integrate both components (the temperature sensor and the electronic circuit) into a housing after an appropriate miniaturization of the electronic components. Self-sufficient sensor capsules are provided in this manner which can be utilized at any desired location on the workpiece.

It is understood that the foregoing description is that of the preferred embodiments of the invention and that various changes and modifications may be made thereto without departing from the spirit and scope of the invention as defined in the appended claims.

What is claimed is:

1. A method for determining the temperature of a workpiece in a flexible manufacturing system such as for correcting of errors introduced by temperature when making length measurements on the workpiece, the method comprising the steps of:
    installing a self-sufficient sensor assembly equipped with temperature sensing means on the workpiece, the sensor assembly including an encapsulated housing and remaining on the workpiece also during the material processing on the workpiece;
    causing the sensor assembly to pass through the material flow together with the workpiece; and,
    transmitting temperature values measured on the workpiece to appropriate remote stations.

2. The method of claim 1, wherein: the workpiece passes through the system as a workpiece unit which includes a pallet and the workpiece mounted on the latter with the sensor assembly being mounted on the pallet.

3. The method of claim 1, wherein: the sensor assembly includes its own voltage supply.

4. The method of claim 1, wherein: energy is also transmitted from the remote station to the sensor assembly.

5. The method of claim 1, wherein: the measured values are wirelessly transmitted.

6. A method for determining the temperature of a workpiece in a flexible manufacturing system such as for correcting of errors introduced by temperature when making length measurements on the workpiece, the method comprising the steps of:
    installing a self-sufficient sensor assembly equipped with temperature sensing means on the workpiece;
    causing the sensor assembly to pass through the material flow together with the workpiece;
    transmitting temperature values measured on the workpiece to appropriate remote stations, the remote stations being connected to a control computer of a coordinate measuring apparatus; and,
    conducting a plausibility check via said control computer of the received measured temperature value after the measured value is transmitted from the sensor assembly to the remote station.

7. A method for determining the temperature of a workpiece in a flexible manufacturing system such as for correcting of errors introduced by temperature when making length measurements on the workpiece, the method comprising the steps of:
    installing a self-sufficient sensor assembly equipped with temperature sensing means on the workpiece;
    causing the sensor assembly to pass through the material flow together with the workpiece, the sensor assembly including a memory;
    storing an identifier for identifying the workpiece and the pallet associated with the sensor assembly in said memory; and,
    transmitting temperature values measured on the workpiece and the identifier to the remote station.

8. The method of claim 7, comprising the further step of additionally transmitting measured values and completed processing results from the remote station to the sensor assembly and storing the same in said memory.

* * * * *